(12) United States Patent
Goenka (10) Patent No.: US 11,757,597 B2
(45) Date of Patent: Sep. 12, 2023

(54) SMART WINDOW ALLOCATION

(71) Applicant: ARRIS Enterprises LLC, Suwanee, GA (US)

(72) Inventor: Anand Kumar Goenka, Bengaluru (IN)

(73) Assignee: ARRIS Enterprises LLC, Suwanee, GA (US)

(*) Notice: Subject to any disclaimer, the term of this patent is extended or adjusted under 35 U.S.C. 154(b) by 0 days.

(21) Appl. No.: 17/961,464

(22) Filed: Oct. 6, 2022

(65) Prior Publication Data

US 2023/0145457 A1 May 11, 2023

Related U.S. Application Data

(60) Provisional application No. 63/255,218, filed on Oct. 13, 2021.

(51) Int. Cl.
*H04L 5/00* (2006.01)
*H04H 20/78* (2008.01)

(52) U.S. Cl.
CPC .......... *H04L 5/0064* (2013.01); *H04H 20/78* (2013.01)

(58) Field of Classification Search
CPC .............................. H04L 5/0064; H04H 20/78
See application file for complete search history.

(56) References Cited

U.S. PATENT DOCUMENTS

| | | | | |
|---|---|---|---|---|
| 6,356,540 B1* | 3/2002 | Kojiro | ................... | H04W 16/12 370/330 |
| 2008/0298299 A1* | 12/2008 | Thesling | ............ | H04B 7/18582 370/316 |
| 2013/0191877 A1* | 7/2013 | Rakib | ................... | H04H 20/06 725/129 |
| 2017/0201993 A1* | 7/2017 | Tomeba | ................... | H04J 11/00 |

* cited by examiner

*Primary Examiner* — Yaotang Wang
(74) *Attorney, Agent, or Firm* — Chernoff, Vilhauer, McClung & Stenzel, LLP (57) ABSTRACT

Techniques for allocating channel frequencies in remote physical device. The channel frequencies are sorted in a predefined order, wherein each channel frequency has a symbol rate. Further, the channel frequencies are grouped into one or more channel groups, wherein each channel group comprises one or more channel frequencies. The one or more channel groups are prioritized from highest priority to lowest priority. Further, the one or more channel frequencies are allocated starting from highest priority channel group to largest size window based on available slots in the largest size window and till a difference between last channel frequency and first channel frequency falls within frequency span limit of the largest size window. Further, prioritizing and allocating are repeated till remaining one or more channel frequencies of the one or more channel groups are allocated to next available windows or the next available windows are exhausted.

20 Claims, 6 Drawing Sheets

FIG. 5

SMART WINDOW ALLOCATION

This application claims the benefit of U.S. Provisional Patent Application Ser. No. 63/255,218 filed Oct. 13, 2021.

TECHNICAL FIELD

The present disclosure generally relates to communication network for routing channel frequencies.

BACKGROUND

Many information-carrying networks such as Cable TV (CATV) networks deliver a large amount of data in a limited frequency spectrum. The frequency spectrum is usually divided into "channels" of a uniform channel width that each carry a Radio Frequency (RF) or other signal from a content provider (ABC, CBS, HBO, ESPN, etc.), where each channel is identified by its starting frequency, referred to throughout this specification as a channel frequency. For example, a typical channel in a CATV network spans a frequency width of 6 MHz, where one channel may be 6 MHZ in width and begin at 10 MHZ, while another channel may also be 6 MHZ in width and begin at 18 MHz.

Information-carrying networks may comprise "edge" devices that receive the incoming content as data packets via a packet-switched network (such as the Internet). Edge devices in various CATV architectures may include headend devices, Remote Physical Devices (RPDs), Remote MAC-PHY Devices (RMDs) etc. These edge devices decode the received packetized data and modulate the information onto downstream channels such that subscribers who have the proper equipment can receive desired content by tuning to that content's associated channel. To modulate the received packetized content onto the proper channels, the edge devices receive tabular information that associates content to be conveyed with its channel frequency.

Managing this incoming stream of channel frequencies is a critical task for the network devices such as a remote physical device (RPD). One task of an RPD is to allocate the incoming stream of channel frequencies among windows implemented by modulator blocks. However, existing RPDs face multifold challenges while allocating the channel frequencies among the available windows. On one hand, the RPD has no control over the incoming stream of channel frequencies. One the other hand, the RPD has its own hardware-related restrictions.

The RPD includes modulators (also called as windows) for modulating content onto the channels that each begin at their respective channel frequency. For performing this task, the RPD must allocate the channels among the modulators (windows). However, hardware restrictions require that all channels allocated to a given modulator have a common width for that modulator, and every channel assigned to modulator a must begin at a channel frequency that is the sum of a constant value for all the modulator's channels plus a multiple of the common width for the modulator. Stated differently, all channels on a modulator must be aligned in both frequency (a common channel width) and phase (offset). Another issue faced by existing RPDs is that the window size (number of slots) is not same for all the modulators (windows). Yet another issue faced by existing RPDs is that symbol rate of all channel frequencies assigned to a modulator typically must also remain the same. These issues not only impact the allocation of channel frequencies, but also further lead to dropped channel frequencies when available slots in the windows are not able to accommodate the channel frequencies. Therefore, there is a long-felt need to address the issues of hardware restriction and symbol rate and provide an efficient technique to allocate the channel frequencies.

The information disclosed in this background section is only for enhancement of understanding of the general background of the invention and should not be taken as an acknowledgement or any form of suggestion that this information forms the prior art already known to a person skilled in the art.

SUMMARY

In one non-limiting embodiment of the present disclosure, a method may comprise the steps of (a) sorting an incoming stream of a plurality of channel frequencies to be allocated to one or more modulators in a predefined order, wherein each channel frequency has a corresponding channel width (b) grouping the plurality of channel frequencies into one or more channel groups, wherein each channel group comprises one or more channel frequencies such that the one or more channel frequencies in each group have a common channel width, and the one or more channel frequencies in each group have the same phase with respect to the common channel width. The method may further comprise step (c) prioritizing the one or more channel groups from highest priority to lowest priority ranked by the number of channels remaining in each respective one or more channel groups. The method may further comprise step (d) allocating sequential ones of the one or more channel frequencies of the highest priority channel group to a selected available modulator for the highest priority channel group so long as allocating a next sequential channel frequency will result in a difference between a last channel frequency and a first channel frequency allocated to the selected modulator falling within a frequency span limit of the selected modulator. The method further comprise step (e) repeating the steps (c) and (d) until the maximum number of channel frequencies are allocated to the one or more modulators.

In another non-limiting embodiment of the present disclosure, the selection of an available modulator prioritizes already in use modulators over modulators not already in use.

In another non-limiting embodiment of the present disclosure, the channel frequencies are grouped based on a symbol rate.

In another non-limiting embodiment of the present disclosure, the frequency span limit of a modulator is determined based on a window size of the modulator and a fixed value of the channel width associated with of the channel group being allocated to the modulator, wherein the window size is indicative of a maximum number of slots of the modulator for accommodating the plurality channel frequencies.

In another non-limiting embodiment of the present disclosure, an apparatus comprises a memory and at least one processor. The at least one processor is configured to perform the operations: (a) sort an incoming stream of a plurality of channel frequencies to be allocated to one or more modulators in a predefined order, wherein each channel frequency has a corresponding channel width; (b) group the plurality of channel frequencies into one or more channel groups, wherein each channel group comprises one or more channel frequencies such that the one or more channel frequencies in each group have a common channel width, and the one or more channel frequencies in each group have the same phase with respect to the common channel width;

(c) prioritize the one or more channel groups from highest priority to lowest priority ranked by the number of channels remaining in each respective one or more channel groups; (d) allocate sequential ones of the one or more channel frequencies of the highest priority channel group to a selected available modulator for the highest priority channel group, so long as allocating a next sequential channel frequency will result in a difference between a last channel frequency and a first channel frequency allocated to the selected modulator falling within a frequency span limit of the selected modulator; and (e) repeat (c) and (d) until the maximum number of channel frequencies are allocated to the one or more modulators.

In another non-limiting embodiment of the present disclosure, for selection of an available modulator, the processor prioritizes already in use modulators over modulators not already in use.

In another non-limiting embodiment of the present disclosure, the processor groups the channel frequencies based on a symbol rate.

In another non-limiting embodiment of the present disclosure, the processor determines the frequency span limit of a modulator based on a window size of the modulator and a fixed value of the channel width associated with of the channel group being allocated to the modulator, wherein the window size is indicative of a maximum number of slots of the modulator for accommodating the plurality channel frequencies.

In another non-limiting embodiment of the present disclosure, a non-transitory computer readable media stores one or more instructions executable by at least one processor. The one or more instructions comprise (a) one or more instructions for sorting an incoming stream of a plurality of channel frequencies to be allocated to one or more modulators in a predefined order, wherein each channel frequency has a corresponding channel width; (b) one or more instructions for grouping the plurality of channel frequencies into one or more channel groups, wherein each channel group comprises one or more channel frequencies such that the one or more channel frequencies in each group have a common channel width, and the one or more channel frequencies in each group have the same phase with respect to the common channel width; (c) one or more instructions for prioritizing the one or more channel groups from highest priority to lowest priority ranked by the number of channels remaining in each respective one or more channel group; (d) one or more instructions for allocating sequential ones of the one or more channel frequencies of the highest priority channel group to a selected available modulator for the highest priority channel group, so long as allocating a next sequential channel frequency will result in a difference between a last channel frequency and a first channel frequency allocated to the selected modulator falling within a frequency span limit of the selected modulator; and (e) one or more instructions for repeating (c) and (d) until the maximum number of channel frequencies are allocated to the one or more modulator.

In another non-limiting embodiment of the present disclosure, for selection of an available modulator, the one or more instructions prioritizes already in use modulators over modulators not already in use.

In another non-limiting embodiment of the present disclosure, the one or more instructions groups the channel frequencies based on a symbol rate.

In another non-limiting embodiment of the present disclosure, the one or more instructions determines the frequency span limit of a modulator based on a window size of the modulator and a fixed value of the channel width associated with of the channel group being allocated to the modulator, wherein the window size is indicative of a maximum number of slots of the modulator for accommodating the plurality channel frequencies In another non-limiting embodiment of the present disclosure, a method may comprise the steps of (a) sorting an incoming stream of a plurality of channel frequencies to be allocated to one or more modulators, each one or more modulator having a plurality of remaining available slots; (b) grouping the plurality of channel frequencies into one or more channel groups each comprising a plurality of channel frequencies. The method further comprises the step of (c) ranking the one or more channel groups from highest priority to lowest priority ranked by the number of channels remaining in each respective one or more channel groups and not yet allocated to a modulator; (d) allocating a subset of the highest priority channel group to a selected available modulator until the selected modulator has no remaining available slots; and (e) repeating the steps (c) and (d) until the maximum number of channel frequencies are allocated to the one or more modulators.

In another non-limiting embodiment of the present disclosure, the incoming stream of channel frequencies are sorted based on one or more hardware restrictions of one or more modulators.

In another non-limiting embodiment of the present disclosure, the one or more hardware restrictions includes at least one of a fixed common channel width for channel frequencies assigned to a modulator, a fixed phase of channel frequencies assigned to a modulator, and a fixed symbol rate of channel frequencies assigned to a modulator.

In another non-limiting embodiment of the present disclosure, the channel frequencies allocated to a selected modulator are all integer multiples of the fixed common channel width.

In another non-limiting embodiment of the present disclosure, available modulators are selected based on the number of remaining slots in each respective modulator, and an available modulator is one where a channel frequencies are assigned to the available modulator given hardware restrictions of the modulator and any channel frequencies previously assigned to the modulator.

Certain advantages provided by at least one of the disclosed embodiments include making best use of the hardware resources while allocating the channel frequencies. Due to effective allocation of the channel frequencies, the disclosed embodiments further help in preventing the dropping of the channel frequencies, thereby providing better experience to subscribers.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. Some embodiments of system and/or methods in accordance with embodiments of the present subject matter are now described, by way of example only, and with reference to the accompanying figures, in which.

It should be appreciated by those skilled in the art that any block diagram herein represent conceptual views of the illustrative system embodying the principles of the present subject matter. Similarly, it will be appreciated that any flowcharts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular form disclosed, but on the contrary, the disclosure is to cover all modifications, equivalents, and alternatives falling within the spirit and the scope of the disclosure.

The terms "comprise(s)", "comprising", "include(s)", or any other variations thereof, are intended to cover a non-exclusive inclusion, such that a setup, device, apparatus, system, or method that comprises a list of components or steps does not include only those components or steps but may include other components or steps not expressly listed or inherent to such setup or device or apparatus or system or method. In other words, one or more elements in a device or system or apparatus proceeded by "comprises . . . a" does not, without more constraints, preclude the existence of other elements or additional elements in the system.

The terms like "at least one" and "one or more" may be used interchangeably or in combination throughout the description.

In the following detailed description of the embodiments of the disclosure, reference is made to the accompanying drawings that form a part hereof, and in which are shown specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense. In the following description, well known functions or constructions are not described in detail since they would obscure the description with unnecessary detail.

The present disclosure relates to a method, an apparatus, and a computer readable media for allocating channel frequencies in a network environment. A continuous stream of the channel frequencies are received at an edge device in a distributed access architecture for distribution to subscribers. Though this specification, for simplicity and consistency, will refer to such an edge device as a Remote Physical Device (RPD), which typically performs physical layer processing, those of ordinary skill in the art will appreciate that the disclosed apparatuses, methods, and systems are also applicable to other edge devices, such as a Remote MACPHY Device (RMD), for instance, which in addition to performing physical layer functions, also performs MAC layer functions.

The RPD has windows or modulator blocks for modulating the incoming stream of channels onto a downstream carrier according to their respective channel frequencies. The RPD modulates the channel frequencies by efficiently allocating them among the windows. The RPD preferably allocates the channel frequencies to particular windows or modulators based on one or more hardware restrictions or characteristics, such as a requirement that the frequency width of the channels assigned to a modulator must share a common width, that the window size (availability of slots) may not be the same for all modulators, the channel frequencies assigned to a modulator must be aligned in phase given a common channel width of channels assigned to a modulator, that the symbol rate of the channel frequencies must also remain the same in the window or the modulator block during the allocation, etc.

Considering the foregoing restrictions, the RPD first sorts the incoming stream of the channel frequencies in a predefined order such as ascending order or descending order. The RPD further groups the sorted channel frequencies into one or more channel groups based on one or more of the restrictions previously recited. For example, grouping may be performed such that the channel frequency width among one or more channels in each channel group has a fixed value or a multiple of the fixed value, and each channel frequency (start frequency) of every channel in each group should be aligned in phase given that fixed value for the channel group. For example, if the channel frequency width is 6 MHz for a list of channels having channel frequencies comprising 57, 63, 69, 79, 85, 117, 123, 129, 135, then the channel frequencies 57, 63, 69, 117, 123, 129, 135 are grouped in first group because each channel has a phase of 3 (the remainder after the channel frequency is divided by 6), whereas the channel frequencies 79 and 85 are grouped in second group because each channel has a phase of 1 (the remainder after the channel frequency is divided by 6). It may be noted that the channel frequency width among the channel frequencies of the first and second group is typically either 6 MHz or multiple of 6 MHz. According to another embodiment, the grouping is performed such that not only the channel frequency width among one or more channel frequencies grouped in each channel group has a fixed value or a multiple of the fixed value, but the one or more channel frequencies of each group also have the same symbol rate.

Post grouping, the one or more channel groups are arranged from highest to lowest priority in a manner that a highest priority channel group comprises highest number of the one or more channel frequencies and a lowest priority channel group comprises lowest number of the one or more channel frequencies. The allocation starts from the highest priority channel group.

Next, starting from highest priority channel group, the RPD allocates the one or more channel frequencies to available windows (modulators) which may be an already used window or a new window, but such that windows already in use are considered prior to new windows. An "available" window is one in which at least one channel from the currently-selected channel group may be added, meaning that the channels in the currently-selected group do not have a different phase offset value than any channel frequency that might already be in the window, that there is an available slot in the window into which the channel frequency may be added, optionally that the channels in the channel group do not have a different symbol rate than any channels already added to the modulator, etc. In essence, an "available window" is one in which a channel from a selected channel group may be added without conflicting with one of the appropriate hardware limitations. In case two or more already-in-use windows are available, the one having largest size (based on number of available slots) will be considered first for the allocation over other already-in-use windows. Similarly, if two or more new windows are available, the one having the largest size (based on number of available slots) will be considered first for the allocation over other new windows. The one or more channel frequencies are allocated in ascending or descending order so long as channels frequencies may be added without a difference between a last channel frequency and a first channel frequency allocated to the window does not exceed a frequency span limit of the window. It may happen that all the channel frequencies of the highest priority channel group may or may not be allocated to the window. In either of these cases, the one or more channel groups may again preferably be ordered from highest to lowest priority order based on the criteria such that highest priority channel group comprises the channel group with the highest number channel frequencies remaining in the group and the lowest priority channel group comprises the channel group with the lowest number of channel frequencies remaining in the group. Next, starting from new highest priority channel group, the RPD allocates one or more channel frequencies to the largest next available sized window. Thus, the RPD may reorder the channel groups each time channels are allocated to a new window (modulator), so that a channel group currently having the highest number of channel frequencies is prioritized over other channel groups. In this manner, the RPD not only optimizes the hardware resources but also satisfies the hardware restrictions and preferably symbol rate restrictions while allocating the channel frequencies.

Figure 1:
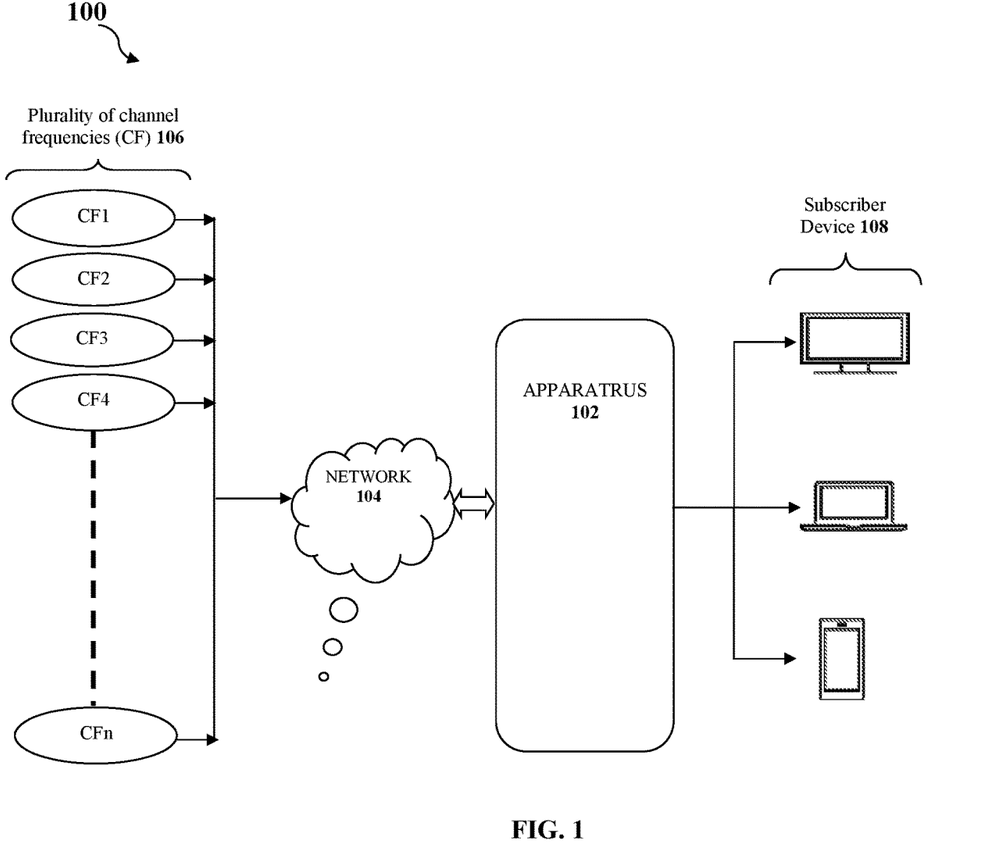
FIG. 1 shows an exemplary environment illustrating allocation of channel frequencies, in accordance with some embodiments of the present disclosure.

FIG. 1 shows an exemplary environment illustrating allocation of channel frequencies in accordance with an embodiment of the present disclosure.

In a non-limiting embodiment, the environment 100 may include a plurality of channel frequencies 106 (CF1-CFn) provided through a network 104 to an apparatus 102 such as an RPD, RMD, or other such device, which in turn provides content to at least one subscriber device 108. The channel frequencies 106 may be associated with various services such as voice, video, data and the like. Further, the network 104 may comprise a data network such as, but not restricted to, the Internet, Local Area Network (LAN), Wide Area Network (WAN), Metropolitan Area Network (MAN), etc. In certain embodiments, the network 104 may include a wireless network, such as, but not restricted to, a cellular network and may employ various technologies including Enhanced Data rates for Global Evolution (EDGE), General Packet Radio Service (GPRS), Global System for Mobile Communications (GSM), Internet protocol Multimedia Subsystem (IMS), Universal Mobile Telecommunications System (UMTS) etc. In one embodiment, the network 104 may include or otherwise cover networks or subnetworks, each of which may include, for example, a wired or wireless data pathway. The apparatus 102 may be a Remote physical device (Remote PHY) capable of receiving the channel frequencies 106 and further processing and transmitting the channel frequencies 106 to the one or more subscribers devices 108. As indicated earlier, the apparatus 102 may be a Remote MACPHY device. The apparatus 102 may also be implemented as any computing device having at least one processor and memory. Further, the subscriber device 108 may comprise any end user device such as, but not limited to, a television, a smart television, a smartphone, a mobile phone, a personal digital assistant, a desktop computer, a laptop computer, a tablet device or any other type of computing device on which the services can be facilitated.

The apparatus 102 i.e., the Remote PHY device or RPD may include modulators i.e., windows for modulating the channel frequencies 106. The apparatus 102 performs the allocation of the incoming stream of the plurality of channel frequencies 106 to the windows so that maximum slots of the windows are utilized, thereby optimizing the hardware resources. As discussed above, the apparatus 102 takes care of the hardware restrictions and symbol rate issue while allocating the channel frequencies 106.

Figure 2:
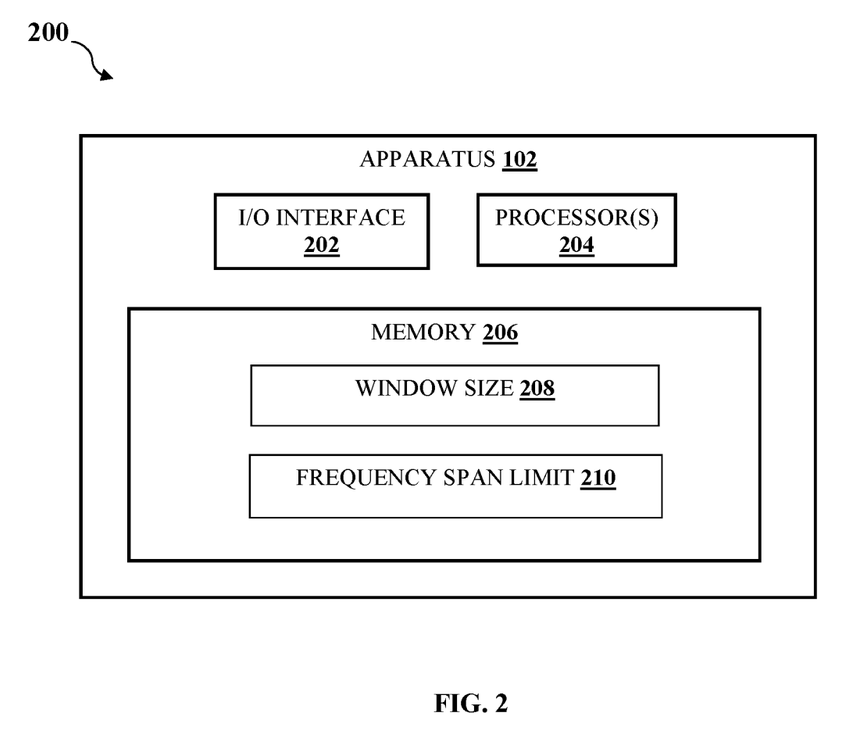
FIG. 2 shows a detailed block diagram illustrating an apparatus, in accordance with some embodiments of the present disclosure.

FIG. 2 shows a detailed block diagram 200 illustrating the apparatus 102 in accordance with some embodiments of the present disclosure. The apparatus 102 may comprise an I/O interface 202, at least one processor 204, and a memory 206. The I/O interface 202 may be configured to receive the plurality of channel frequencies 106 and ultimately transmit the content contained in them to the subscribers via the modulators as previously described. The memory 206 may be communicatively coupled to the at least one processor 204 and may store the window size 208 of each window/modulator of the apparatus 102. The window size 208 describes the maximum number of channel frequencies that can be allocated in the window. For example, a window having a window size of "32" can accommodate a maximum of 32 channel frequencies. The memory 206 may also store the frequency span limit 210 of each window. The frequency span limit 210 is a difference between largest channel frequency and smallest channel frequency that can be allocated to a window, and is calculated by multiplying the window size 208 with the channel width. For example, a window having a window size "32" can accommodate channel frequencies having a channel width of 6 MHz such that difference between the largest channel frequency and the smallest channel frequency must be within the frequency span limit of 32*6=192 MHz. The at least one processor 204 may be configured to perform one or more functions of the apparatus 102 as described in the present disclosure.

Figure 4A:
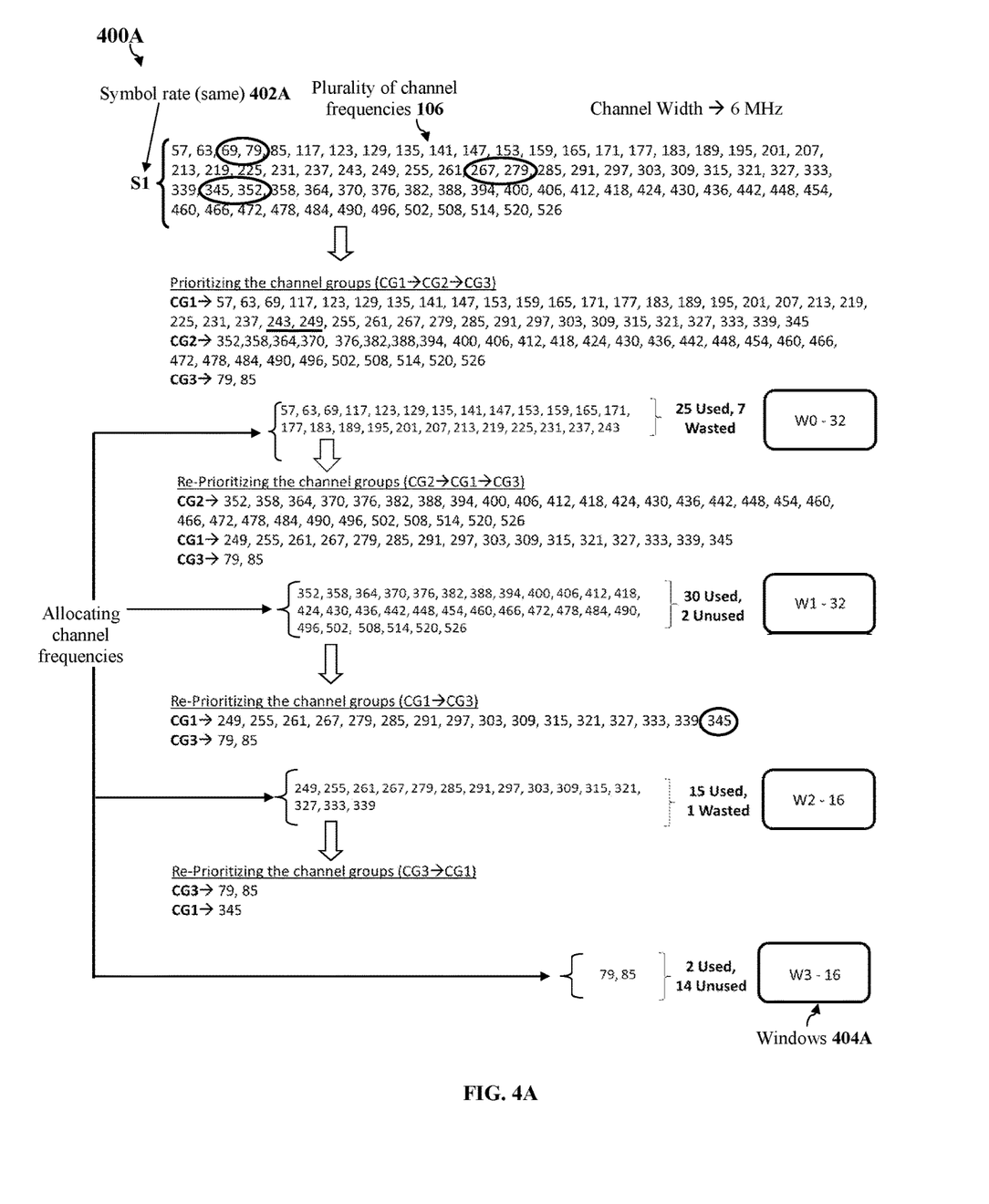
FIG. 4A shows an example of allocation of channel frequencies having similar symbol rate into new windows, in accordance with some embodiments of the present disclosure.
Figure 4B:
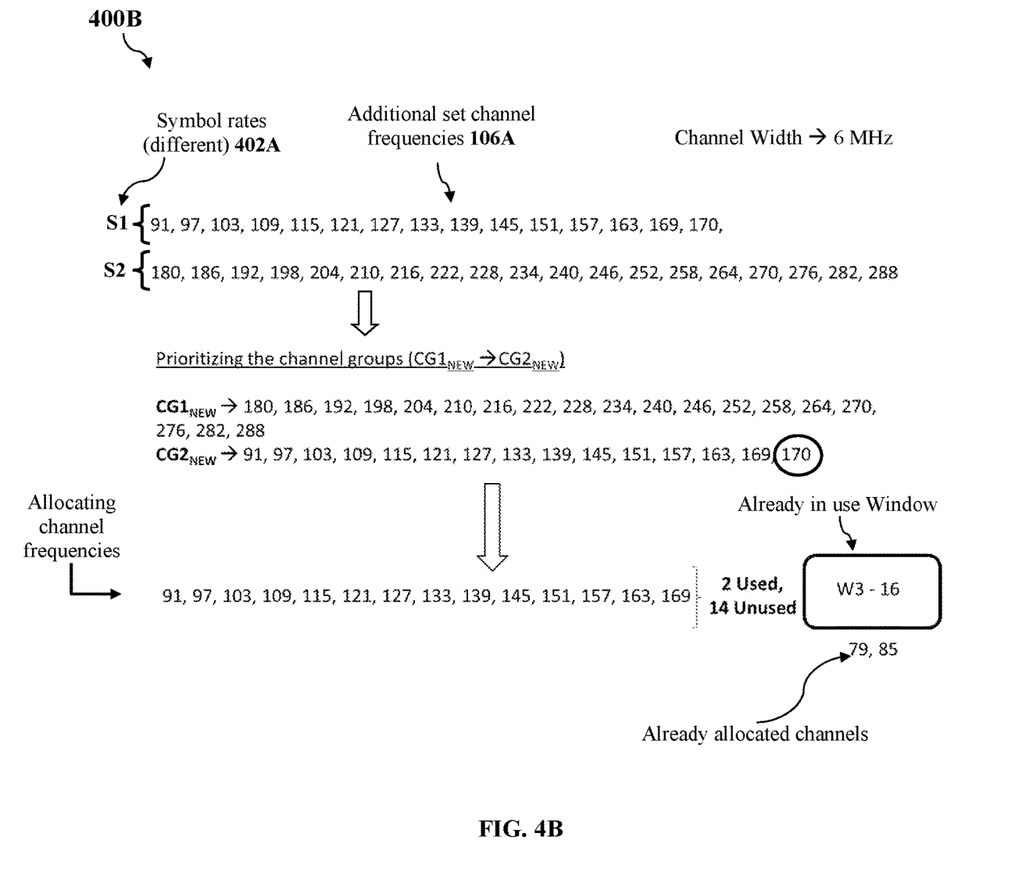
FIG. 4B shows an example of allocation of additional set of channel frequencies having different symbol rates into already in use window, in accordance with some embodiments of the present disclosure.

The detailed working of the apparatus 102 will now be explained using examples 400A and 400B shown in FIG. 4A and FIG. 4B respectively. FIG. 4A shows an embodiment of the present disclosure, in which the apparatus 102 allocates the plurality of channel frequencies 106 having "same symbol rate" into new windows. FIG. 4B shows an embodiment of the present disclosure, in which the apparatus 102 allocates the additional set of channel frequencies 106A having "different symbol rates" into already in use window.

In FIG. 4A, a plurality of channel frequencies 106 may together comprise frequencies starting from 57 MHz and extending to 526 MHz, where each channel frequency has a width of 6 MHz. In the first step, the at least one processor 204 may sort the plurality of channel frequencies 106 to be allocated to one or more windows 404A in a predefined order, wherein in some embodiments each channel frequency in a group has the same symbol rate. According to this example, the plurality of channel frequencies 106 are sorted in an ascending order. Further, there are four windows shown i.e., W0, W1, W2, and W4 having window sizes 32, 32, 16 and 16 respectively. The window size 208 indicates the maximum number of slots available for allocation. According to this example, all the windows are considered to be a new window having all slots empty. Also, all channel frequencies i.e., 57 to 526 have the same symbol rate 402A according to this example. The following paragraphs will now be explained how the "grouping of channel frequencies" and "window allocation" are performed repetitively until channel frequencies are added to the modulators in the most efficient manner (i.e., the utilization of the available slots in the modulators is maximized), while meeting all required hardware restrictions.

Grouping

The at least one processor 204 groups the plurality of channel frequencies 106 into one or more channel groups in a manner such that a channel frequency width (in this case uniformly 6 MHz) of each of the one or more channel frequencies of each channel group is a fixed value, and each channel in the group begins on a frequency that is the sum of a constant phase offset value plus a multiple of that frequency width. Thus, in reference to the channel frequencies assigned to modulator W0 in FIG. 4A, each channel frequency begins on a value that is equal to the phase offset plus an integer multiple of 6. Using this procedure, three channel groups (CG1, CG2 and CG3) are formed such that the first channel group (CG1) comprises the channel frequencies starting from 57-69 and 117-345, second channel group (CG2) comprises the channel frequencies 352-526, and third channel group (CG3) comprises the channel frequencies 79-85. The second channel group is created because there is gap of "7" between the channel frequencies 345 and 352, and therefore channel frequency 352 is not in a continuous range of 6 MHz with respect to channel frequency 345. Similarly, the third channel group is created because there is a gap of "10" between the frequencies 69 and 79, and therefore channel frequency 79 is not in a continuous range of 6 MHz with respect to channel frequency 69. In the first channel group, since the gaps between the pairs frequencies (69-117 and 267-279) are 48, 12 (which is multiple of 6), these channel frequencies are considered in the same channel group. After creating the three channel groups, the at least one processor 204 arranges them in an order of priority for performing the window allocation. The order of priority is set such that a channel group having a highest number of channel frequencies is assigned highest priority, and a channel group having lowest number of the channel frequencies is assigned as lowest priority. Considering this criteria, CG1 which is having "41" channel frequencies is assigned with highest priority, CG2 which is having "30" channel frequencies is assigned with next highest priority, and CG3 which is having only "2" channel frequencies is assigned with lowest priority.

Window Allocation

In next step, the at least one processor 204 starts the allocation process and allocates the channel frequencies (57-69 and 117-243) of the CG1 to the window W0 of window size "32". As stated above, all the windows are considered to be empty (new window), thus having all the slots available for allocation. However, according to embodiments of present disclosure, the at least one processor 204 first determines whether the one or more available windows 404A, to which the channel frequencies to be allocated is a window that is already used or a new window. Based on this determination, the at least one processor 204 performs the allocation of the channel frequencies in such a manner that the window that was already used is selected prior to the new window. Also, the window with the largest window size (regardless of whether it is already in use or is new window) is given preference over the other available windows during the allocation. This maximizes the slot utilization of the windows, thereby optimizing hardware resources.

Starting from CG1, the at least one processor 204 allocates the channel frequencies to a window among the windows 404A based on the criterion that the channel frequencies are allocated until a next sequential channel cannot be added without a difference between a last channel frequency and a first channel frequency allocated to the window 404A exceeding a frequency span limit 210 of the window 404A. In other words, a next sequential channel frequency may be added so long, as after adding the channel frequency, a difference between a last channel frequency and a first channel frequency allocated to the window falls within the frequency span limit of the window. Preferably, the frequency span limit 210 of the window is determined based on a maximum number of slots (W0-32, W1-32, W2-16, W3-16) associated with the window and the channel frequency width (e.g., 6 MHz). Thus, the frequency span limit 210 of W0 and W1 is 32*6=192 MHz, and of W2 and W3 is 16*6=96 MHz.

Following the above criterion, the at least one processor 204 allocates the channel frequencies 57-243 to window W0. Considering the allocation at window W0 it can be observed that the total count of the channel frequencies 57-243 is 25, however the maximum number of slots available (window size 208) of window W0 is 32. Also, the difference between the last channel frequency (243) and a first channel frequency (57) allocated to the window W0 falls within the frequency span limit 210 of the window W0. That is, difference between 243 and 57 is 186 MHz which falls within the frequency span limit 210 of W0 i.e., 192 MHz. Here, it can be understood that the 7 unused slots of W0 are due to the gap between channel frequencies 69 and 117.

Grouping

After performing the allocation at the window W0, if there are remaining channel frequencies in CG1 that were not allocated to window W0, the at least one processor 204 removes those channel frequencies of CG1 which are already allocated and "reorders" from the group, i.e., the channel groups are reprioritized based on the previously recited priority criteria such that a channel group having a highest number of channel frequencies is assigned highest priority, and a channel group having lowest number of the channel frequencies is assigned as lowest priority. Since only the channel frequencies (57-243) of CG1 were allocated at W0, the remaining channel frequencies (249-345) are still available for allocation. However, this time, the second channel group i.e., CG2 comes on higher priority order than CG1 based on the reordering. This is because, CG2 have a total number of "30" channel frequencies (352-526), whereas CG1 is now left with only "16" channel frequencies (249-345). Further, CG3 which have only "2" channel frequencies (79 & 85) is still on the least priority. Optionally, for simplicity of implementation, an alternative embodiment may always reprioritize the channel groups even if there are no remaining channel frequencies in CG1 that were not allocated to window W0, although in this circumstance the channel groups will not be reordered.

Window Allocation

Based on the above priority order, the at least one processor 204 again performs the window allocation process starting from CG2. The at least one processor 204 allocates the channel frequencies of CG2 to next available window having the largest window size which is W1 based on the criterion that a next sequential channel frequency may be added so long, as after adding the channel frequency, a difference between a last channel frequency and a first channel frequency allocated to the window falls within the frequency span limit 210 of the window. Following this criterion, the at least one processor 204 allocates all the channel frequencies 352-526 to window W1 having the window size 32. This is because, considering the allocation at window W1, it can be observed that total count of the channel frequencies 352-526 is 30, however the maximum number of slots available (window size 208) of window W1 is 32 Further, the difference between the last channel frequency (526) and a first channel frequency (352) allocated to the window W1 also falls within the frequency span limit 210 of the window W1. That is, the difference between 526 and 352 is 174 MHz which falls within the frequency span limit 210 of W1 i.e., 192 MHz. Here, the two slots of W1 are still left unused after allocating the channel frequencies of CG2. In the subsequent paragraphs, it is explained how the window W1 left with two unused slots will be considered as "already in use window" for performing the allocation of remaining channel frequencies of channel groups.

Grouping

After performing the allocation at window W1, the at least one processor 204 removes the CG2 and re-order the remaining channel groups based on the previously recited priority criteria such that a channel group having a highest number of channel frequencies is assigned highest priority, and a channel group having lowest number of the channel frequencies is assigned as lowest priority. Now, the first channel group i.e., CG1 again comes on higher priority order based on the re-ordering. This is because, CG1 has "16" channel frequencies (249-345) which were left during window allocation of W0, whereas CG3 is still on least priority which is having only "2" channel frequencies (79 & 85).

Window Allocation

Next, the at least one processor 204 allocates the channel frequencies of CG1 to a next available window. In this case, since the window W1 which is the only already in use window having 2 unused slots, the at least one processor 204 tests W1 as being an "available window." However, since the channel frequencies of CG1 are not in phase with the previously assigned channel frequencies of W1, the channel frequencies of CG1 cannot be assigned to W1, meaning W1 is not an "available window." Hence, the at least one processor 204 moves to the next available largest size window i.e., W2 having the window size 16. Considering the allocation at window W2, it can be observed that total count of the channel frequencies (249-345) to be allocated is 16 which is the same as the maximum number of slots available (window size 208) of window W2 i.e., 16. However, the difference between the last channel frequency (345) to be allocated and a first channel frequency (249) does not fall within the frequency span limit 210 of the window W2. That is, the difference between 345 and 249 is 96 MHz. Therefore, the at least one processor 204 will only sequentially add channel frequencies 249-339 until it reaches channel frequency 345, which will not be added. Thus, in window W2, 15 slots are utilized while 1 slot is wasted due to the gap between the channel frequencies 267 and 279.

Grouping

After performing the allocation at window W2, the at least one processor 204 re-orders the remaining channel groups based on the previously recited priority criteria such that channel group having a highest number of channel frequencies is assigned highest priority, and a channel group having lowest number of the channel frequencies is assigned as lowest priority. Now, the third channel group i.e., CG3 comes on higher priority order than CG1 based on the re-ordering. This is because, CG3 has two channel frequencies (79-85), whereas CG1 is left with only one channel frequency (345).

Window Allocation

Next, the at least one processor 204 allocates the channel frequencies of CG3 to the next available window. In this case, since the window W1 which is the only already in use window having 2 unused slots, the at least one processor 204 again considers W1 prior to the next available largest size window W3 for allocating the channel frequencies of CG3. However, since the channel frequencies of CG3 is also not in phase with the previously assigned channel frequencies of W1, the channel frequencies of CG3 cannot be assigned to W1. Hence, the at least one processor 204 moves to the next available largest size window i.e., W3 having the window size 16. The at least one processor 204 allocates the channel frequencies (79 & 85) of CG3 to window W3. After allocating the channel frequencies of CG3, the at least one processor 204 removes CG3 and is left with only one channel group CG1 having only one channel frequency "345" for allocation. However, since the channel frequency 345 of CG1 is not in phase with the previously assigned channel frequencies of W1 or W3, the channel frequency 345 cannot be allocated in either of these already in use windows i.e., W1 and W3. Now in the next paragraph, window allocation is explained considering "only W3" as an already in use window which is having 14 unused slots.

Window Allocation in Already in Use Window

As shown in FIG. 4B, assume that a set of additional channel frequencies 106A (91, 97, 103, 109, 115, 121, 127, 133, 139, 145, 151, 157, 163, 169, 170, 180, 186, 192, 198, 204, 210, 216, 222, 228, 234, 240, 246, 252, 258, 264, 270, 276, 282, and 288) having different symbol rates with respect to each other are provided through the network 104 to the apparatus 102 for allocation. For example, the channel frequencies (91, 97, 103, 109, 115, 121, 127, 133, 139, 145, 151, 157, 163, 169, 170) have the symbol rate "S1" (the same as the symbol rate of all channels in FIG. 4A), whereas the channel frequencies (180, 186, 192, 198, 204, 210, 216, 222, 228, 234, 240, 246, 252, 258, 264, 270, 276, 282, and 288) have a symbol rate "S2".

Grouping

In this case, the at least one processor 204 creates two channel groups $CG1_{NEW}$ and $CG2_{NEW}$ not only based on the number of channel frequencies but also based on symbol rates. The $CG1_{NEW}$ comprises a total of "19" channel frequencies (180-288) having the symbol rate S2, and $CG2_{NEW}$ comprises a total of 15 channel frequencies (91-170) having the symbol rate S1. Since the number of channel frequencies in $CG1_{NEW}$ is higher than $CG2_{NEW}$, the channel group $CG1_{NEW}$ is given a higher priority than $CG2_{NEW}$.

Window Allocation

In next step, the at least one processor 204 selects the first channel frequency "180" of $CG1_{NEW}$ for allocating to the "already in use window" W3 having 14 unused slots available for allocation, because there are more channels in this channel group than the channel group associated with S1. But the channel frequencies of $CG1_{NEW}$ belongs to symbol rate S2 which is not similar to the symbol rate S1 of the already assigned channels frequencies 79 and 85 of W3. Moreover, the channel frequencies of $CG1_{NEW}$ is also not in phase with the channel frequencies already assigned in W1. Hence, due to these hardware restrictions, the at least one processor 204 does not allocate the channel frequencies of $CG1_{NEW}$ though it was on priority. Now, the at least one processor 204 selects the next channel group $CG2_{NEW}$ and allocates the channel frequencies 91-169 of $CG2_{NEW}$ into the already in use window W3. It can be noted that out of total 15 channel frequencies (91-170) of $CG2_{NEW}$, the first fourteen channel frequencies 91-169 are allocated while the last channel frequency 170 is dropped. This is because, only the first fourteen channel frequencies 91-169 fit within the frequency span limit 210 of the window W3, and also have the same symbol rate. In this manner, the systems and methods described in the present disclosure not only allocates the channel frequencies to new windows but also to already in use window, thereby maximizing the slots utilization of the windows.

Figure 3:
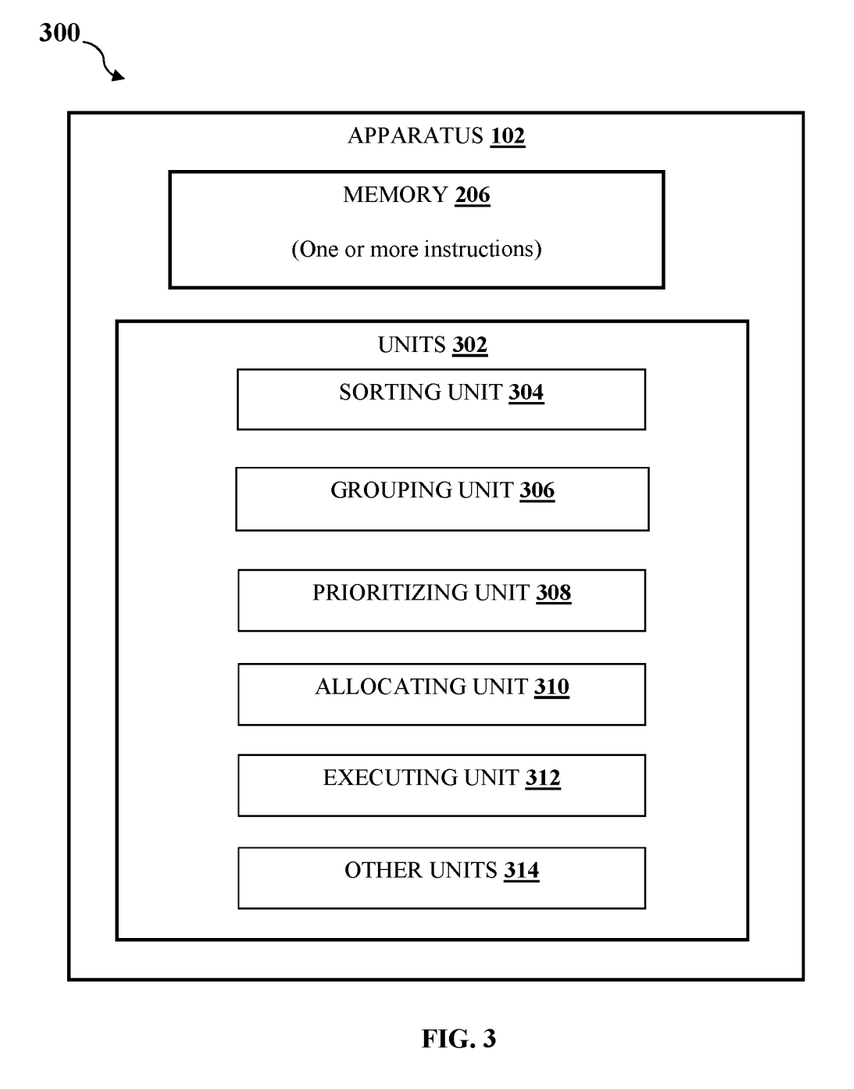
FIG. 3 shows another block diagram illustrating an apparatus, in accordance with some embodiments of the present disclosure.

In another non-limiting embodiment of the present disclosure, the apparatus 102 may comprise various units or means as shown in FIG. 3. The units 302 may comprise a sorting unit 304, a grouping unit 306, a prioritizing unit 308, an allocating unit 310, an executing unit 312, and other units 314. The other units 314 may perform operations like modulating and any other operation of the apparatus 102. In an embodiment, the units 304-314 may be dedicated hardware units capable of executing one or more instructions stored in the memory 310 for performing various operations of the apparatus 102. In another embodiment, the units 304-314 may be software modules stored in the memory 206 which may be executed by the at least one processor 204 for performing the operations of the apparatus 102.

Figure 5:
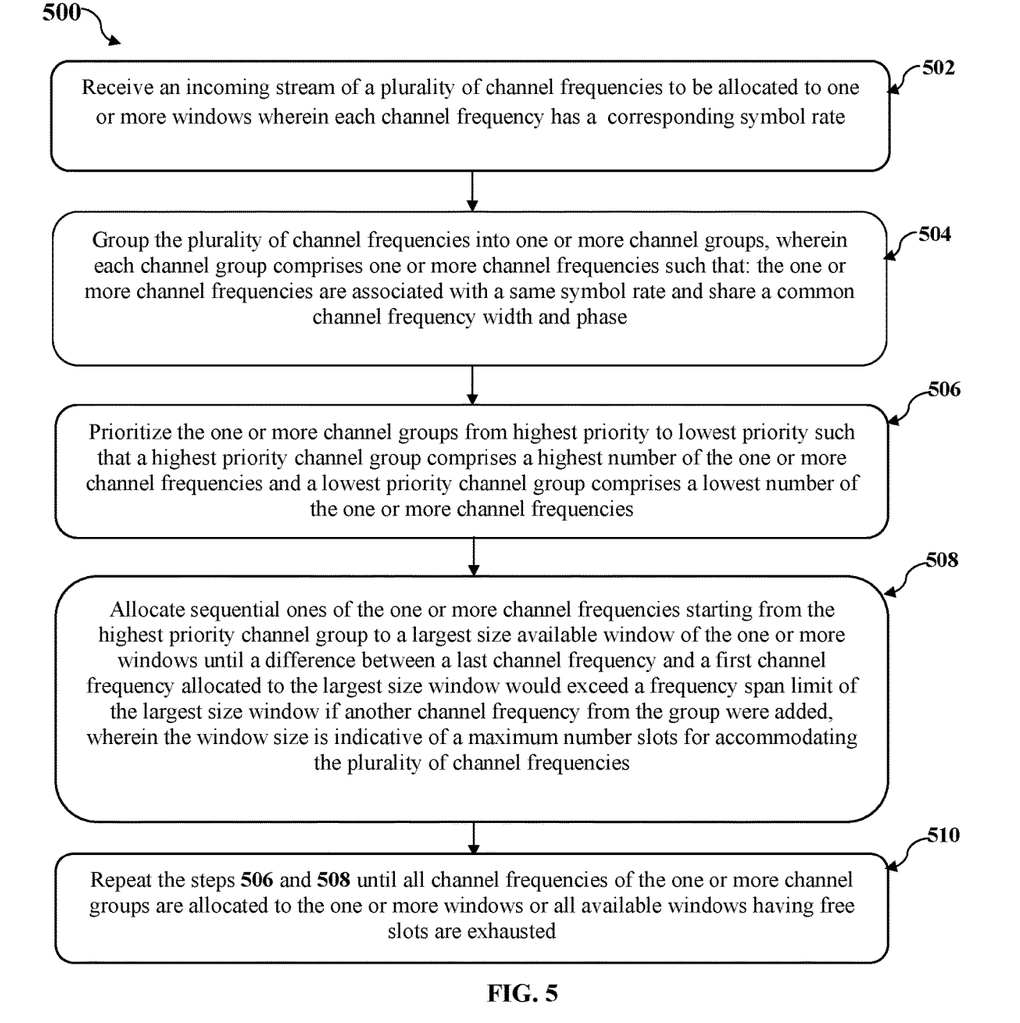
FIG. 5 shows a flowchart illustrating a method of allocating of channel frequencies, in accordance with some embodiments of the present disclosure.

FIG. 5 shows a flowchart illustrating one embodiment of a method of allocating the channel frequencies according to the foregoing description.

As illustrated in FIG. 5, the method 500 comprises one or more blocks for allocating the channel frequencies using an apparatus 102. The method 500 may be described in the general context of computer executable instructions. Generally, computer executable instructions can include routines, programs, objects, components, data structures, procedures, modules, and functions, which perform particular functions or implement particular abstract data types.

The order in which the method 500 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 502, the method may include receiving an incoming stream of a plurality of channel frequencies 106 to be allocated to one or more windows, wherein each channel frequency has a corresponding symbol rate. The operations of block 502 may be performed by the at least one processor 204 (of FIG. 2) or a sorting unit 304 (of FIG. 3).

At block 504, the method includes grouping the plurality of channel frequencies 106 into one or more channel groups, wherein each channel group comprises one or more channel frequencies such that the one or more channel frequencies are associated with a same symbol rate, and share a common channel frequency width and phase. The operations of block 504 may be performed by the at least one processor 204 (of FIG. 2) or a grouping unit 306 (of FIG. 3).

At block 506, the method includes prioritizing the one or more channel groups from highest priority to lowest priority such that a highest priority channel group comprises a highest number of the one or more channel frequencies and a lowest priority channel group comprises a lowest number of the one or more channel frequencies. The operations of block 506 may be performed by the at least one processor 204 (of FIG. 2) or a prioritizing unit 308 (of FIG. 3).

At block 508, the method includes allocating sequential ones of the one or more channel frequencies starting from the highest priority channel group to a largest size available window of the one or more windows until a difference between a last channel frequency and a first channel frequency allocated to the largest size window would exceed a frequency span limit 210 of the largest size window if another channel frequency from the group were added. Further, the window size is indicative of a maximum number of slots for accommodating the plurality of channel frequencies. The operations of block 508 may be performed by the at least one processor 204 (of FIG. 2) or an allocating unit 310 (of FIG. 3).

At block 510, the method includes repeating the steps of blocks 506 and 508 until all channel frequencies of the one or more channel groups are allocated to the one or more windows or all available windows having free slots are exhausted. The operations of block 510 may be performed by the at least one processor 204 (of FIG. 2) or an executing unit 312 (of FIG. 3).

In a non-limiting embodiment of the present disclosure, one or more non-transitory computer-readable media may be utilized for implementing the embodiments consistent with the present invention. A computer-readable media refers to any type of physical memory (such as the memory 206) on which information or data readable by a processor may be stored. Thus, a computer-readable media may store one or more instructions for execution by the at least one processor 204, including instructions for causing the at least one processor 204 to perform steps or stages consistent with the embodiments described herein. The term "computer-readable media" should be understood to include tangible items and exclude carrier waves and transient signals. By way of example, and not limitation, such computer-readable media can comprise Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Thus, certain aspects may comprise a computer program product for performing the operations presented herein. For example, such a computer program product may comprise a computer readable media having instructions stored (and/or encoded) thereon, the instructions being executable by one or more processors to perform the operations described herein. For certain aspects, the computer program product may include packaging material.

The various illustrative logical blocks, modules, and operations described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may include a microprocessor, but in the alternative, the processor may include any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

As used herein, a phrase referring to "at least one" or "one or more" of a list of items refers to any combination of those items, including single members. As an example, "at least one of: a, b, or c" is intended to cover: a, b, c, a-b, a-c, b-c, and a-b-c. The terms "a", "an" and "the" mean "one or more", unless expressly specified otherwise.

The terms "an embodiment", "embodiment", "embodiments", "the embodiment", "the embodiments", "one or more embodiments", "some embodiments", and "one embodiment", "other embodiment", "yet another embodiment", "non-limiting embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

A description of an embodiment with several components in communication with each other does not imply that all such components are required. On the contrary, a variety of optional components are described to illustrate the wide variety of possible embodiments of the invention.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the appended claims.

REFERRAL NUMERALS

| Reference Number | Description |
| --- | --- |
| 100 | ENVIRONMENT |
| 102 | APPARATUS |
| 104 | NETWORK |
| 106 | CHANNEL FREQUENCIES |
| 108 | SUBSCRIBER DEVICES |
| 200 | BLOCK DIAGRAM OF APPARATUS |
| 202 | I/O INTERFACE |
| 204 | PROCESSOR |
| 206 | MEMORY |
| 208 | WINDOW SIZE |
| 210 | FREQUENCY SPAN LIMIT |
| 300 | BLOCK DIAGRAM OF APPARATUS |
| 304 | SORTING UNIT |
| 306 | GROUPING UNIT |
| 308 | PRIORITIZING UNIT |
| 310 | ALLOCATING UNIT |
| 312 | EXECUTING UNIT |
| 314 | OTHER UNITS |

The invention claimed is:

1. A method comprising:
(a) sorting an incoming stream of a plurality of channel frequencies to be allocated to one or more modulators in a predefined order, wherein each channel frequency has a corresponding channel width;
(b) grouping the plurality of channel frequencies into one or more channel groups, wherein each channel group comprises one or more channel frequencies such that:
the one or more channel frequencies in each group have a common channel width; and
the one or more channel frequencies in each group have the same phase with respect to the common channel width;
(c) prioritizing the one or more channel groups from highest priority to lowest priority ranked by a number of channels remaining in each respective one or more channel groups;
(d) allocating sequential ones of the one or more channel frequencies of the highest priority channel group to a selected available modulator for the highest priority channel group, so long as allocating a next sequential channel frequency will result in a difference between a last channel frequency and a first channel frequency allocated to the selected modulator falling within a frequency span limit of the selected modulator; and
(e) repeating (c) and (d) until a maximum number of channel frequencies are allocated to the one or more modulators.

2. The method of claim 1, wherein the predefined order is an ascending order or a descending order.

3. The method of claim 1, wherein selection of an available modulator prioritizes already in use modulators over modulators not already in use.

4. The method of claim 1, wherein the channel frequencies are grouped based on a symbol rate.

5. The method of claim 1, wherein the frequency span limit of a modulator is determined based on a window size of the modulator and a fixed value of the channel width associated with of the channel group being allocated to the modulator, wherein the window size is indicative of a maximum number of slots of the modulator for accommodating the plurality channel frequencies.

6. An apparatus comprising:
a memory; and
at least one processor configured to:
(a) sort an incoming stream of a plurality of channel frequencies to be allocated to one or more modulators in a predefined order, wherein each channel frequency has a corresponding channel width;

(b) group the plurality of channel frequencies into one or more channel groups, wherein each channel group comprises one or more channel frequencies such that:
the one or more channel frequencies in each group have a common channel width, and
the one or more channel frequencies in each group have the same phase with respect to the common channel width;

(c) prioritize the one or more channel groups from highest priority to lowest priority ranked by a number of channels remaining in each respective one or more channel groups;

(d) allocate sequential ones of the one or more channel frequencies of the highest priority channel group to a selected available modulator for the highest priority channel group, so long as allocating a next sequential channel frequency will result in a difference between a last channel frequency and a first channel frequency allocated to the selected modulator falling within a frequency span limit of the selected modulator; and (e) repeat (c) and (d) until a maximum number of channel frequencies are allocated to the one or more modulators.

7. The apparatus of claim 6, wherein the predefined order is an ascending order or a descending order.

8. The apparatus of claim 6, wherein for selection of an available modulator, the processor prioritizes already in use modulators over modulators not already in use.

9. The apparatus of claim 6, wherein the processor groups the channel frequencies based on a symbol rate.

10. The apparatus of claim 6, wherein the frequency span limit of a modulator is determined based on a window size of the modulator and a fixed value of the channel width associated with of the channel group being allocated to the modulator, wherein the window size is indicative of a maximum number of slots of the modulator for accommodating the plurality channel frequencies.

11. A non-transitory computer readable media storing one or more instructions executable by at least one processor, the one or more instructions comprising:

(a) one or more instructions for sorting an incoming stream of a plurality of channel frequencies to be allocated to one or more modulators in a predefined order, wherein each channel frequency has a corresponding channel width;

(b) one or more instructions for grouping the plurality of channel frequencies into one or more channel groups, wherein each channel group comprises one or more channel frequencies such that:
the one or more channel frequencies in each group have a common channel width, and
the one or more channel frequencies in each group have the same phase with respect to the common channel width;

(c) one or more instructions for prioritizing the one or more channel groups from highest priority to lowest priority ranked by a number of channels remaining in each respective one or more channel groups;

(d) one or more instructions for allocating sequential ones of the one or more channel frequencies of the highest priority channel group to a selected available modulator for the highest priority channel group, so long as allocating a next sequential channel frequency will result in a difference between a last channel frequency and a first channel frequency allocated to the selected modulator falling within a frequency span limit of the selected modulator; and (e) one or more instructions for repeating (c) and (d) until a maximum number of channel frequencies are allocated to the one or more modulators.

12. The non-transitory computer readable media of claim 11, wherein the predefined order is an ascending order or a descending order.

13. The non-transitory computer readable media of claim 11, wherein for selection of an available modulator, the one or more instructions prioritizes already in use modulators over modulators not already in use.

14. The non-transitory computer readable media of claim 11, wherein the one or more instructions groups the channel frequencies based on a symbol rate.

15. The non-transitory computer readable media of claim 11, wherein the frequency span limit of a modulator is determined based on a window size of the modulator and a fixed value of the channel width associated with of the channel group being allocated to the modulator, wherein the window size is indicative of a maximum number of slots of the modulator for accommodating the plurality channel frequencies.

16. A method comprising:

(a) sorting an incoming stream of a plurality of channel frequencies to be allocated to one or more modulators, each one or more modulator having a plurality of remaining available slots;

(b) grouping the plurality of channel frequencies into one or more channel groups each comprising one or more channel frequencies;

(c) ranking the one or more channel groups from highest priority to lowest priority ranked by a number of channels remaining in each respective one or more channel groups and not yet allocated to a modulator;

(d) allocating a subset of the highest priority channel group to a selected available modulator until the selected modulator has no remaining available slots;

(e) repeating (c) and (d) until a maximum number of channel frequencies are allocated to the one or more modulators.

17. The method of claim 16, wherein the incoming stream of channel frequencies are sorted based on one or more hardware restrictions of one or more modulators.

18. The method of claim 17, wherein the one or more hardware restrictions includes at least one of a fixed common channel width for channel frequencies assigned to a modulator, a fixed phase of channel frequencies assigned to a modulator, and a fixed symbol rate of channel frequencies assigned to a modulator.

19. The method of claim 18, wherein the channel frequencies allocated to a selected modulator are all integer multiples of the fixed common channel width.

20. The method of claim 16, wherein available modulators are selected based on the number of remaining slots in each respective modulator, and an available modulator is one where a channel frequencies are assigned to the available modulator given hardware restrictions of the modulator and any channel frequencies previously assigned to the modulator.

* * * * *